July 13, 1965 D. C. ENGELBART 3,195,117

BIPOLAR MAGNETIC CORE CIRCUIT

Filed Nov. 5, 1962 2 Sheets-Sheet 1

DOUGLAS C. ENGELBART
INVENTOR.

BY Samuel Lindenberg

ATTORNEY

July 13, 1965 D. C. ENGELBART 3,195,117

BIPOLAR MAGNETIC CORE CIRCUIT

Filed Nov. 5, 1962 2 Sheets-Sheet 2

DOUGLAS C. ENGELBART
INVENTOR.

BY Samuel Lindenberg

ATTORNEY 3,195,117
Patented July 13, 1965

3,195,117

BIPOLAR MAGNETIC CORE CIRCUIT

Douglas C. Engelbart, Palo Alto, Calif., assignor to AMP Incorporated, Harrisburg, Pa., a corporation of New Jersey Filed Nov. 5, 1962, Ser. No. 235,454
4 Claims. (Cl. 340—174)

Ths invention relates to magnetic core circuit arrangements and more particularly to improvements in magnetic core shift register circuits.

Multi-aperture core shift register circuits using one core per stage of the shift register are known. In operation these circuits effectuate a transfer of flux from one stage to the other when ONE binary bit is being transferred and no flux transfer when a ZERO binary bit is being transferred. Therefore, the load which a transfer or drive current source sees, varies with the information content within the shift register which is being shifted.

Another situation which can occur is due to the fact that no output occurs from a shift register stage when it is cleared from one of its two states of magnetic remanence. Thus there is no way of knowing whether this is as it should be or whether the register has lost a binary digit and an error has occurred.

An object of this invention is to provide an arrangement for a shift register circuit wherein the load presented to the transfer current source is constant, regardless of the information within the shift register.

Another object of this invention is the provision of a shift register circuit wherein the detection of the occurrence of an error can be achieved.

Yet another object of the present invention is the provision of an arrangement for a shift register circuit wherein there is a flux transfer between stages regardless of the binary bit content of the stages.

Still another object of the present invention is the provision of a novel, and useful circuit arrangement for a magnetic core shift register.

These and other objects of the present invention may be achieved in a magnetic core shift register circuit wherein two cores are provided for each stage of the shift register. These two cores respectively designated as the first and second core, each has a set and a clear state of magnetic remanence. When the first core is in its set state of remanence and the second core in its clear state of remanence, the shift register stage represents a ONE binary digit. When the first and second cores are respectively in their clear and set states of magnetic remanence, then the shift register stage is storing a ZERO binary bit. A transfer winding couples the two cores of a preceding stage of the shift register to the two cores of a succeeding stage of the shift register, in a manner so that, when the preceding stage of the shift register is cleared the two cores to which the transfer winding is coupled are caused to assume the states of remanence of the two cores being cleared. In other words, the direction of current flow induced in the transfer winding is determined by the binary bit which has been stored in the stage of the shift register which is being cleared. Thus, there is a transfer of flux between stages regardless of the binary bit which is stored.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figures 1, 2:
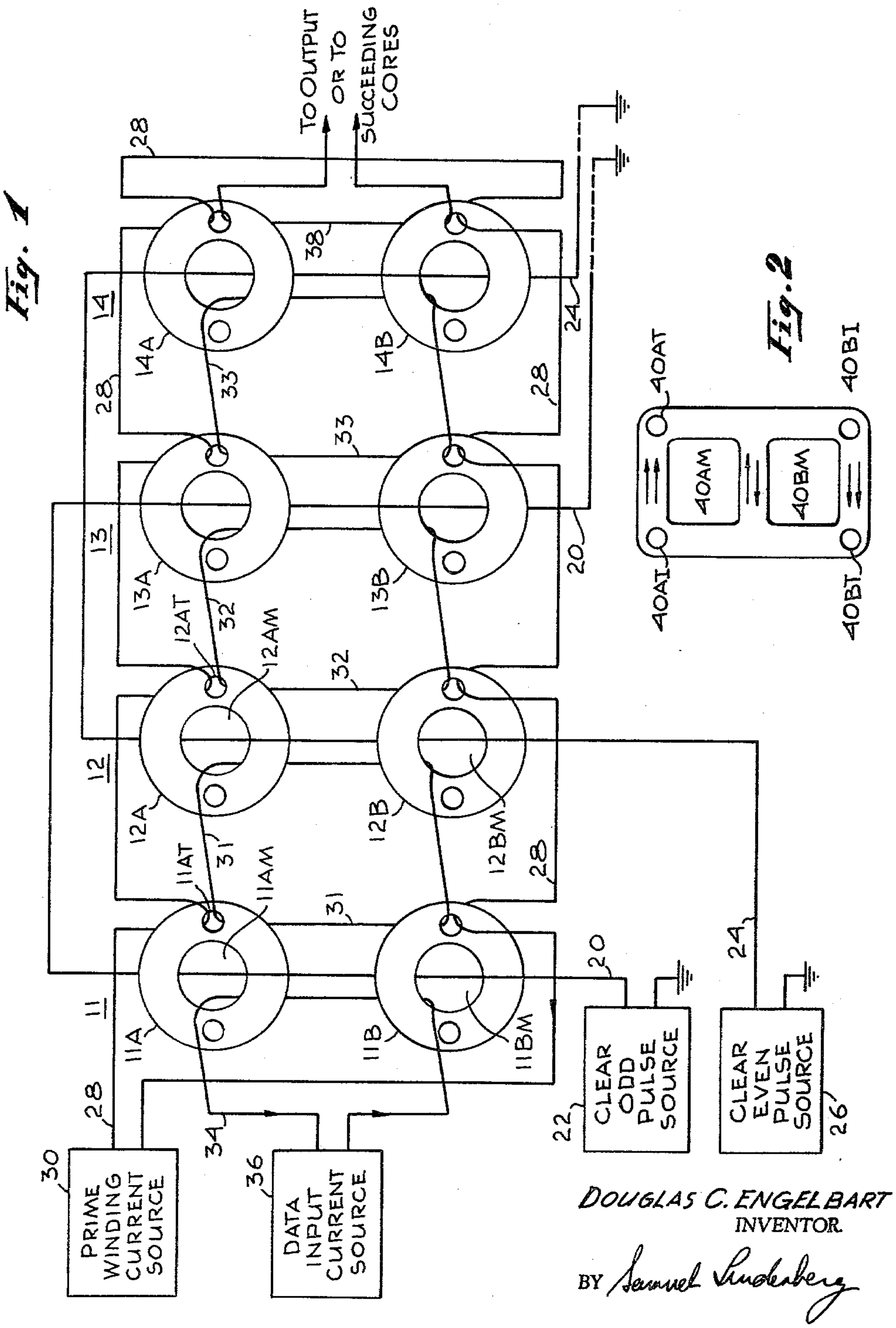
FIGURE 1 is a schematic-circuit diagram of an embodiment of this invention using two cores per stage of the shift register.
FIGURE 2 shows a specially shaped core which can be used instead of the two cores in a stage of the shift register.

Reference is now made to FIGURE 1 of the drawings which shows an embodiment of this invention. Four shift register stages, respectively 11, 12, 13 and 14 are shown. These are by way of illustration and not by way of limitation of the size of the shift register which can be built embodying the principles of this invention. Stage 11 comprises two magnetic ferrite cores, respectively 11A, 11B. Stage 12 has two cores, respectively 12A, 12B. Stage 13 has two cores, respectively 13A, 13B. And stage 14 has two cores, respectively 14A, 14B.

All of the cores of the shift register have a central or a main aperture and a transmit aperture. These are respectively designated as 11AM and 11AT, for core 11A, 11BM and 11BT for core 11B, 12AM and 12AT for core 12A, and 12BM and 12BT for core 12B. A clear, odd core winding 20 is inductively coupled in sequence to all the cores in all the odd stages, 11, 13, of the shift register by passing through the main apertures of these cores. A clear, odd, current pulse source 22 applies current pulses when required to the winding 20 to drive the cores in the odd shift registers stages to their clear states. A clear, even, winding 24 is inductively coupled in sequence to all the cores in all the even numbered stages of the shift register, respectively 12 and 14, by passing through the main apertures of these cores. A clear, even pulse source 26 applies current pulses to the winding 24 when required. A prime winding 28 is coupled to all the cores in the shift register by passing in sequence through the transmit apertures of each one of these cores. A D.C. priming current is applied to this winding from a prime winding current source 30.

The terminology which will be employed herein, with respect to the designation of the various states of magnetic remanence which the magnetic cores assume, is well known in the magnetic core art. A magnetic core is supposed to have at least two magnetic flux paths around its central aperture which are effectively separated whenever a terminal aperture occurs. A magnetic core is said to be in its clear state when the magnetic flux in both of these paths circulates around the central aperture in the same direction. A magnetic core is said to be in its set state when the directions of circulation of the magnetic flux in these two paths are opposite. A magnetic core is said to be in its primed state when the magnetic flux around the magnetic material surrounding the transmit aperture has its direction reversed to the direction it had when the magnetic core was placed in its set state. As is well known, the purpose of the clear windings is to restore the magnetic cores from whatever state of remanence they were in, to the clear states. The function of the prime winding current source and the prime winding 28 is to drive a magnetic core which is previously driven to its set state to its prime state. The prime winding current has substantially no effect on a magnetic core which is in its clear state.

Each one of the stages of the shift register is coupled to the succeeding stage of the shift register by a transfer winding respectively 31, 32, and 33. There is an input winding 34, which has current applied to it from a data input current source 36 for the purpose of entering data into the shift register. An output winding 38 is coupled to the core in the last stage of the shift register.

In accordance with this invention a shift register stage is storing a ONE binary bit when one of the two cores of that stage is in its clear state and the other is in its set state. The stage is storing a ZERO binary bit when the states of magnetic remanence of the two cores are interchanged. For the purpose of explanation let it be assumed that the stage of a shift register is storing a ONE binary bit when the A core of that stage is in its set state and the B core of that stage is in its clear state, and storing a ZERO when the two cores have the reciprocal states of magnetic remanence. Thus, in order to enter a binary ONE into the shift register stage 11, it is necessary that the data input current source 36 apply a current to the input winding 34 which flows in a direction to drive core 11A to its set state, while leaving core 11B in its clear state. The input winding 34 is connected to the cores 11A and 11B with opposite winding sense and accordingly, a current having the direction of the arrows, which is applied to the winding 34, will set core 11A and leave core 11B in the clear state.

The prime winding current from the source 30 is applied to the winding 28 and flows in a direction to cause a reversal of the magnetic flux around the transmit aperture 11AT.

Upon the application of a current pulse from the clear, odd pulse source to the clear, odd winding 20, magnetomotive forces are applied to both cores 11A and 11B. The direction of these forces however, is such that core 11B is driven further into the clear state of saturation while, core 11A is driven from the primed state of remanence to the clear state of remanence. As a result, a current is induced in the transfer winding 31 which has a current flow direction such as to drive core 12A to its set state of magnetic remanence leaving core 12B unaffected. Core 12A is then primed by the operation of the prime winding current source and prime winding. A current pulse applied from the clear-even pulse source 26 to the clear-even core winding 24 drives core 12A to its clear state while leaving clear core 12B substantially unaffected. The result of this drive, is to induce a current in the transfer winding 32 which drives core 13A to its set state leaving core 13B substantially unaffected.

In the manner just described, by successively actuating the clear-odd pulse source and the clear-even pulse source, the ONE binary bit is successively advanced from shift register stage to shift register stage. Assume now that the data input current source 36 has applied current to the winding 34 which has a direction such as to drive core 11B to its set state while core 11A remains in its clear state. This operation occurs when it is desired to introduce a ZERO into the first shift register stage. In response to the clear-odd pulse source, this time the magnetic core 11B is driven to its clear state. The sense of the transfer winding 31 coupling to the transmit aperture 11BT is such that, a reverse current is caused to flow in that winding in response to the clear-odd core drive applied to the core 11B. The direction of current flow together with the sense of the transfer winding coupling, to the cores 12A and 12B is such that core 12B is driven to its set state and the core 12A remains substantially unaffected in its clear state. The clear-even pulse source applies a current pulse to the clear-even core winding 24 whereby, the ZERO representative conditions of the cores 12A and 12B are effectively transferred to the next shift register stage, comprising the cores 13A and 13B.

It should be apparent that, regardless of whether a shift register stage is storing a ONE or a ZERO binary digit, there is always a transfer of flux from the preceding to the succeeding shift register stages. Therefore, as far as the clear-odd pulse source and clear-even pulse source which are the drive sources for the shift register are concerned, they will always see the same load, because they are always driving the same number of cores from their primed to their clear states, regardless of the data which is in the shift register. The drive, applied by the cores in a preceding shift register stage to the cores in a succeeding shift register stage, is a differential one. That is, the current induced in the transfer winding flows in one direction or the other through said winding and in either case, because of the sense of the coupling to the cores tends to drive the cores toward their opposite states of magnetic remanence. The coupling of the output winding on the last stage of the shift register is substantially identical as the coupling of the transfer winding for the preceding stages of the shift register. As a result, the output of the shift register will be a current of one polarity for one of the binary digits and of the opposite polarity for the opposite binary digit.

In place of using two cores for each stage of the shift register, it is possible by using a specially shaped core to replace these two cores with the specially shaped core. FIGURE 2 shows the specially shaped core 40. The derivation of this core from two cores of the shift register may be seen if, the two cores are brought together until they effectively form a figure eight. The terminal apertures are placed at the four corners. This is the appearance of the single core 40. There are two main apertures therein respectively, 40AM and 40BM. In the upper left hand corner there is an input terminal aperture 40AI. In the upper right hand corner there is an output terminal aperture 40AT. In the lower right hand corner there is an input terminal aperture 40BI and in the lower left hand corner there is a transmit aperture 40BT. The two "0" sections of the figure eight can operate independently in the manner of two independent cores; for example, 11A and 11B.

Figure 3:
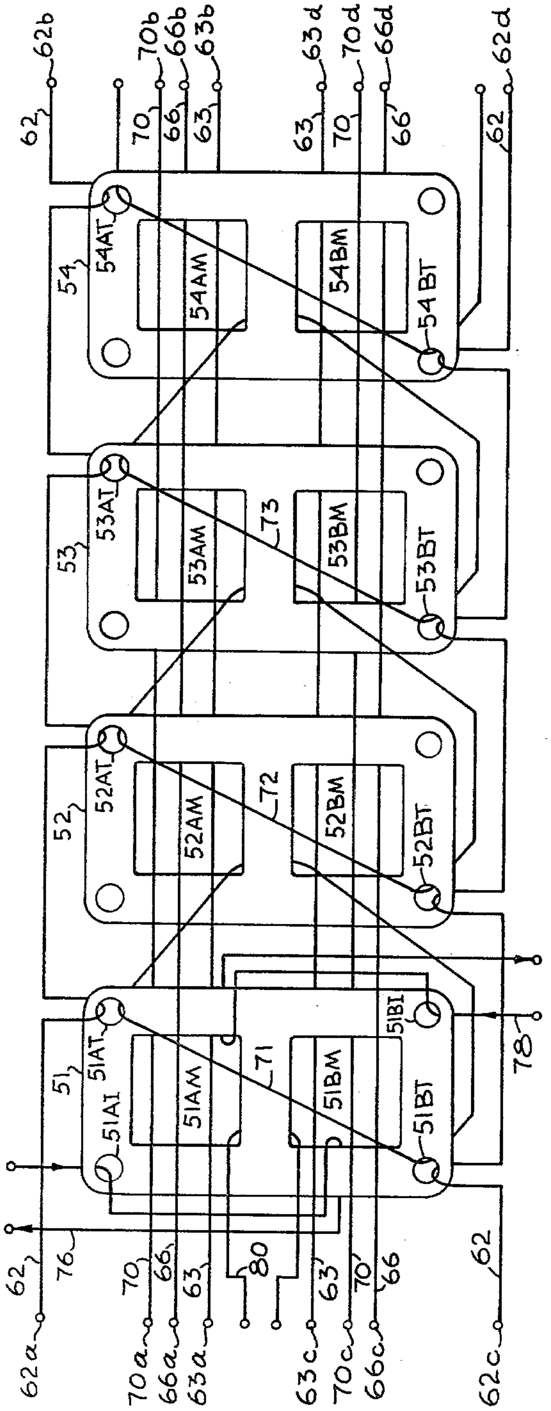
FIGURE 3 is a schematic diagram of a shift register comprised of the specially shaped cores, but which are operated in accordance with the principles of the invention shown in FIGURE 1.

Reference is now made to FIGURE 3 of the drawings, wherein there may be seen a circuit diagram of a shift register composed of the specially shaped cores which operates in the manner described for the operation of the shift register shown in FIGURE 1. The shift register has four stages each including a figure eight core respectively 51, 52, 53, and 54. The core 51 includes two main apertures, respectively 51AM, 51BM. The upper section of the core includes a transmit aperture 51AT. The lower section of the core includes a transmit aperture 51BT. The respective cores in the other sections of the shift register, 52, 53, 54, all are identical to the core in the shift register stage 51.

Figure 4:
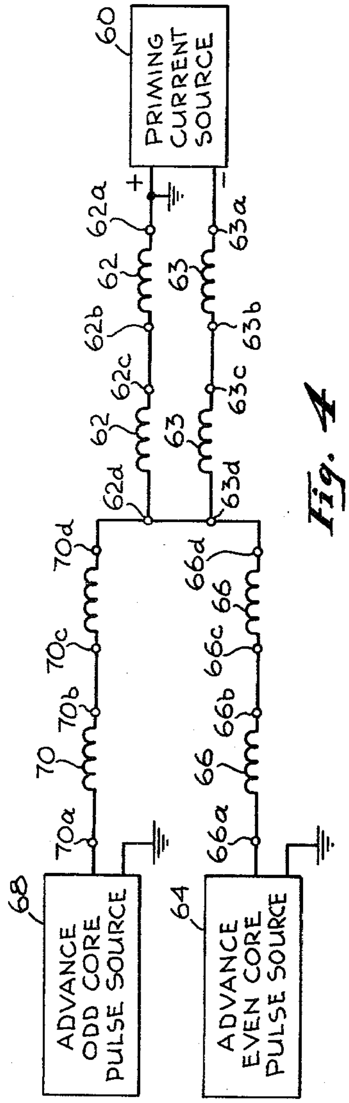
FIGURE 4 is a circuit diagram of the windings shown in FIGURE 3.

In FIGURE 3 the actual disposition of the windings necessary to operate the shift register are shown, but not their interconnections. FIGURE 4 is a circuit diagram of the windings only which are shown in FIGURE 3. Both FIGURES 3 and 4 will therefore be described together.

A priming current source 60 applies a priming current to a priming winding 62 which extends between terminals 62*a*, 62*b*, 62*c*, and 62*d*, and to a holding winding 63 which extends between terminals 63*a*, 63*b*, 63*c*, and 63*d*. The holding winding is inductively coupled to all cores of the shift register. The priming winding is inductively coupled to all the upper and lower sections of all of the cores in the shift register by passing through the transmit apertures of these cores. An advance even current pulse source 64 applies advancing current to an advance odd even winding 66 which extends between terminals 66*a*, 66*b*, 66*c* and 66*d*. This winding is successively coupled to all of these even shift register stages and passes through the main apertures of the upper halves of the cores 52, 54, in the even numbered shift register stages. As a result, in response to a current pulse being applied to the advance even core winding 66, both the upper and lower halves of these cores are simultaneously driven to their clear states.

An advance odd current pulse source 68 applies current, when required, to a winding 70 extending between terminals 70*a*, 70*b*, 70*c*, and 70*d*. This winding is coupled to the cores in the even numbered shift register stages and successively passes through the main aperture in the upper halves of these cores and then through the main apertures in the lower halves of these cores. The affect of the application of a current pulse to the winding 70 is to simultaneously drive both upper and lower halves of the cores in the odd numbered shift register stages to their clear states. All the windings are connected together at their "*d*" terminals in accordance with the circuit of FIGURE 4.

A transfer winding, respectively 71, 72, 73, inductively couples each one of preceding stages of the shift register to the succeeding stage of the shift register. The sense of the coupling is of the transfer winding on a core made in a manner so that the drive current induced in a transfer winding has a current flow direction to drive one half of the core in the succeeding stage to its clear state and the other half to its set state. A transfer winding, such as 71 is inductively coupled to the core 51 by passing through its transmit apertures 51AT and 51BT with an opposite sense, and thereafter is inductively coupled to the core 52 by passing down through its upper aperture 52AM around the central bar and up through its lower main aperture 52BM. Current kowing through the transfer winding provides drives to the opposite states of remanence to the magnetic material in the upper and lower sections of the core.

There are three different input arrangements shown for establishing binary data in the first core 51. One arrangement employs a winding 76 which threads through the input aperture 51AI and then around through the main aperture 51BM. A current applied to the winding 76 can drive the lower core sections surrounding the aperture 51BM to its clear state and the magnetic material of the upper core section surrounding the aperture 51AM to its set state. Another winding 78, is disposed in a complementary manner to the winding 76. It passes through the input aperture 51BI and then through the upper central aperture 51AM. Current applied to its winding can drive the magnetic material around the central aperture 51BM to its set state and the magnetic material around the aperture 51AM to its clear state. Therefore, the windings 76 and 78 can be employed to introduce a ONE binary bit or a ZERO binary bit into the core 51. A third winding 80, is inductively coupled to the core by passing around the central leg of the core. A current flow in one direction through the winding 80 will drive the magnetic material around the aperture 51AM to its clear state and the magnetic material around the aperture 51BM to its set state. A current in the opposite direction will reverse the set and clear states of the materials around the apertures 51AM and 51BM.

As soon as the magnetic material of an upper or lower magnetic core section is in its set state, then the primary current drives the magnetic material around the transmitting aperture in that section of the magnetic core, in a direction so that the magnetic core section is in its primed state. The purpose of the holding winding 63 is to prevent the primary operation from affecting the other cores or the other core section.

Assume that the magnetic core 51 has been set into a ONE representative condition, which by way of example, is one in which the upper section of the core 51, or the magnetic material surrounding the aperture 51AM is in its set state and the lower section, or the magnetic material surrounding the aperture 51BM is in its clear state. The application of a current pulse to the winding 66 drives the magnetic material around the aperture 51AM to its clear state, whereby a voltage is induced in the winding 71. In response to this voltage a current flows which applies a magnetomotive force to the magnetic material surrounding the aperture 52AM to drive it to its set state of magnetic remanence, and applies a magnetomotive force to the magnetic material surrounding the aperture 52BM to drive this magnetic material toward its clear state of magnetic remanence. Thereby, there is a flux transfer from core 51 to core 52 in a manner to leave core 52 in a state wherein it represents a binary ONE digit.

Assume now that the core 51 was placed in its ZERO representative state. Then the magnetic material surrounding the main aperture 51BM is in its prime state and the material surrounding the aperture 51AM is in its clear state. The application of a current drive to the winding 66 serves to drive the core 51 to its clear state in response to which a voltage is induced in the transfer winding 71. The polarity of this voltage is opposite to the polarity of the voltage described as being induced in this winding previously. Thus, a current will flow in the opposite direction with the result that the core 52 will be driven to its ZERO representative state wherein the magnetic material around the lower aperture 52BM is in its set state and the magnetic material around the aperture 52AM is in its clear state.

It should be appreciated that in response to successive drives of the advance odd pulse source and advance even pulse source the states of the cores of the preceding stages of the shift register are successively transferred to the cores of the succeeding stages of the shift register. Since there is always a flux transfer between stages, regardless of the information which is stored in the shift register, the load on the drive source is always constant.

Using the figure eight shaped core in the shift register has many advantages. From the manufacturing standpoint the advantage of handling a single core per stage instead of two cores per stage, simplifies the handling process. The windings can be more easily inserted through the cores, a simple jig can hold these cores in winding position as compared to the complexity introduced by the two core per bit arrangement shown in FIGURE 1. Thus, besides the electrical advantages which accrue as a result of this invention, a great number of mechanical advantages are also made available.

There has been accordingly described and shown herein, a novel, useful, shift register which simplifies the problem of driving a shift register. Furthermore, in view of the fact, that an output must always be received from the shift register regardless of whether the output signals is a ONE or a ZERO, the user is always in position to know whether or not an error has occurred. This is not possible where an output signal is only received when only one type of binary signal provides an output from the register. Finally, a unique construction for a shift register is provided wherein, the manufacturing of a shift register is considerably simplified.

I claim:

1. A shift register comprising a plurality of stages arranged in sequence, each of said stages comprising magnetic ferrite means, each said magnetic ferrite means comprising a magnetic ferrite core having first and second adjacent input apertures separated by a ferrite cross member to provide a substantially figure eight shaped core, a first and second input aperture disposed at opposite corners of said figure eight shaped core, each said magnetic ferrite means having two separable said clear states of magnetic remanence, two separable set states of magnetic remanence, each said stage storing a one data bit when said magnetic ferrite means is in a clear and set state and storing a zero data bit when said magnetic ferrite means is reversed to a set and clear state, a separate transfer winding means coupling the magnetic ferrite means in a preceding shift register stage to the magnetic ferrite means in a succeeding shift register stage for transferring the respective clear and set states of magnetic remanence of the magnetic ferrite means in a preceding stage to the magnetic ferrite means in a succeeding stage, each said separate transfer winding means comprising a winding passing through the first and second output apertures with a respective opposite coupling sense and thereafter passing through one of said input apertures around said ferrite cross member and then through the other of said input apertures, first means for driving to their two separable clear states of remanence the magnetic ferrite means in all alternate stages of said shift registers wherein the states of remanence are transferred by the transfer winding means to the magnetic ferrite means in the remaining shift register stages, and means for driving the magnetic ferrite means simultaneously in all the remaining shift register stages to their two separable clear states of remanence to effectuate a transfer through said transfer winding means of the states of magnetic remanence of said magnetic ferrite means to the magnetic ferrite means in the alternate stages of the shift register.

2. A shift comprising a plurality of stages arranged in sequence each of said stages comprising magnetic ferrite body having two adjacent input apertures separated by a bar of ferrite material to provide a substantially figure eight shaped device, a first and second input aperture located at opposite corners of said ferrite body, the magnetic material of said body surrounding each of said input apertures having two opposite states of magnetic remanence, winding means coupled to the magnetic ferrite body of a first stage of said register for driving the magnetic material surrounding said two input apertures to predetermined states of magnetic remanences, first clear winding means for driving to a predetermined one of the states of magnetic remanence the ferrite magnetic material surrounding the two adjacent input apertures of bodies comprising alternate stages of said register, second clear winding means for driving to said predetermined one of the states of magnetic remanence the ferrite magnetic material surrounding the two adjacent input apertures of bodies comprising remaining stages of said register, and a separate transfer winding between each two stages means coupling the body of a preceding stage of said register to the body of a succeeding stage of said register for transferring the states of magnetic remanence of the preceding body to the succeeding body in response to said preceding body being driven by one of said clear winding means.

3. A shift register as recited in claim 2 wherein said first clear winding means includes a first winding which first passes through one of the two input apertures of the bodies in alternate stages of said register and then passes through the other of the two input apertures of the bodies in alternate stages of said register with the same relative coupling sense, and said second clear winding means includes a second winding which first passes through one of the two input apertures of the bodies in the remaining stages of said register and then passes through the other of the two input apertures of the bodies in the remaining stages of said register with the same relative coupling sense.

4. A shift register as recited in claim 2 wherein said each said transfer winding means comprises a winding which passes through each of the output apertures of a preceding body to couple to said body with a relative opposite sense at these apertures and then passes through each of the input apertures of a succeeding body with a relatievly opposite sense to couple to the ferrite magnetic material surrounding these input apertures with a relatively opposite sense.

References Cited by the Examiner

UNITED STATES PATENTS

| | | | |
|---|---|---|---|
| 2,803,812 | 8/57 | Rajchman et al. | 340—174 |
| 3,086,124 | 4/63 | Schulte | 340—174 |
| 3,144,639 | 8/64 | Richard et al. | 340—174 |

IRVING L. SRAGOW, *Primary Examiner.*